(12) United States Patent
Gomatam et al.

(10) Patent No.: US 11,115,120 B2
(45) Date of Patent: Sep. 7, 2021

(54) DISINTEGRATED SOFTWARE DEFINED OPTICAL LINE TERMINAL

(71) Applicant: Sterlite Technologies Limited, Aurangabad (IN)

(72) Inventors: Badri Gomatam, Maharashtra (IN); Saurabh Chattopadhyay, Maharashtra (IN)

(73) Assignee: Sterlite Technologies Limited, Aurangabad (IN)

( * ) Notice: Subject to any disclaimer, the term of this patent is extended or adjusted under 35 U.S.C. 154(b) by 0 days.

(21) Appl. No.: 16/286,544

(22) Filed: Feb. 26, 2019

(65) Prior Publication Data
US 2021/0036778 A1 Feb. 4, 2021

(30) Foreign Application Priority Data
Dec. 31, 2018 (IN) .............................. 201821050053

(51) Int. Cl.
*H04B 10/25* (2013.01)
*H04B 10/27* (2013.01)
*H04L 12/24* (2006.01)
*H04L 12/723* (2013.01)

(52) U.S. Cl.
CPC ............ *H04B 10/25* (2013.01); *H04B 10/27* (2013.01); *H04L 41/20* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 2014/0133320 A1* | 5/2014 | Stark | H04L 47/2483 370/252 |
| 2015/0125146 A1* | 5/2015 | Erreygers | H04B 10/25 398/58 |
| 2018/0337942 A1* | 11/2018 | Htay | H04L 63/1441 |

* cited by examiner

*Primary Examiner* — Casey L Kretzer

(57) ABSTRACT

The present disclosure relates to an optical line terminal device. The optical line terminal device includes a data center point of presence module, one or more access point of presence modules and one or more aggregation point of presence modules. The data center point of presence module includes a first region and a second region. The first region includes a leaf and spine fabric and a top-of-rack architecture. The second region includes compute infrastructure and storage infrastructure. Further, the one or more access point of presence modules include optical line terminal-Gigabit Passive Optical Networks access input/output and Metro Ethernet Access input/output. The one or more aggregation point of presence include access input/output hardware abstraction, limited compute infrastructure and multi-protocol label switching transfer router.

18 Claims, 3 Drawing Sheets

DISINTEGRATED SOFTWARE DEFINED OPTICAL LINE TERMINAL

BACKGROUND

The present disclosure relates to the field of packet based computer networks. More particularly, the present disclosure relates to disaggregated software defined optical line terminals. The present application is based on, and claims priority from an Indian Application Number 201821050053 filed on 31 Dec. 2018 the disclosure of which is hereby incorporated by reference.

DESCRIPTION OF THE RELATED ART

Software defined networking in passive optical networks enables service providers to control and manage resources shared with end users. The software defined networking allows applications to control network resources or control flow of information in the passive optical network. In addition, the software defined networking based passive optical network enables the service providers to fulfill the high bandwidth demand of the end users. Typically, the passive optical network enables transmission of data over fiber optic lines. The passive optical networks are used for fiber to the home (FTTH) applications. The data is transmitted or routed from a central location or a central office or a data center to multiple end points. The passive optical network includes an optical line terminal (OLT) stationed in premises of the central office along with a number of optical network units or optical network terminals near end users. The optical line terminal (OLT) is an endpoint hardware device in the passive optical network. Separation of control plane from the OLT is necessary for the implementation of the software defined architecture for a GPON/10GPON/XGS-PON/NG-PON/NG-PON2 access network. However, most industry initiatives today focus on setting up all disaggregated parts of OLT in the same Access POP of the OLT. Currently, the physical space and hosting capabilities are limited and particular POP (Point of Presence) doesn't have enough infrastructure to fit multiple networking and compute infrastructure. While this eases the challenges of handling security, high availability and real-time communication attributes across the disaggregated parts, in many deployment areas Access POP Physical Infrastructure falls short to support hosting all these disaggregated parts together.

BRIEF SUMMARY OF THE INVENTION

In an aspect, the present disclosure provides an optical line terminal device for establishment of functional disintegration of internal functions of optical line terminal device. The optical line terminal device includes a data center point of presence module. In addition, the optical line terminal device includes one or more access point of presence modules. Further, the optical line terminal device includes one or more aggregation point of presence modules. The data center point of presence module, the one or more access point of presence modules and the one or more aggregation point of presence modules perform distribution of the internal functions of the optical line terminal device. The internal functions of the optical line terminal device are aggregated in a ratio of n:m:1. n corresponds to a number of access point of presence modules and m corresponds to a number of aggregation point of presence modules. In addition, 1 represents the centrally hosted internal functions of the optical line terminal at the data center point of presence module. Further, the functional disintegration of the internal functions of optical line terminal devices overcomes a problem of occupying large space for installation of the optical line terminal device. The optical line terminal device utilizes software defined networking technology for establishment of the functional disintegration density of the internal functions of the optical line terminal device.

In yet another aspect, the present disclosure provides a method for establishment of functional disintegration of internal functions of an optical line terminal. The method includes disintegrating the optical line terminal into a plurality of points of presence. The plurality of points of presence include a data center point of presence, one or more access points of presence and one or more aggregation points of presence. In addition, the method includes disaggregating the plurality of points of presence at one or more locations. Further, the method includes establishing logical connections between each of the plurality of points of presence. The logical connections between the each of the plurality of points of presence determine compute and network capacity requirements for each of the plurality of points of presence. Furthermore, the method includes distributing the internal functions of the optical line terminal. Each of the plurality of presence performs distribution of the internal functions of the optical line terminal. The internal functions of the optical line terminal are aggregated in a ratio of n:m:1. n corresponds to the number of access points of presence and m corresponds to the number of aggregation points of presence. 1 represents the centrally hosted internal functions of the optical line terminal at the data center point of presence. The method utilizes software defined networking technology for establishment of the functional disintegration of the internal functions of the optical line terminal.

A primary object of the present disclosure is to provide disintegrated optical line terminal devices using software defined network technology.

Another object of the present disclosure is to logically connect a plurality of points of presence (POP) of the optical line terminal with each other through a network.

Yet another object of the present disclosure is to provide physically separated and logically connected optical line terminals.

Yet another object of the present disclosure is to establish functional disintegration density of internal functions of optical line terminals.

In an embodiment of the present disclosure, the data center point of presence module, the one or more access point of presence modules and the one or more aggregation point of presence modules are logically connected with each other through a network. The logical connections between the data center point of presence module, the one or more access point of presence modules and the one or more aggregation point of presence modules determines compute and network capacity requirements for the data center point of presence module, the one or more access point of presence modules and the one or more aggregation point of presence modules.

In an embodiment of the present disclosure, the data center point of presence module includes a first region and a second region. The first region comprises a leaf and spine fabric and a top-of-rack architecture. The second region comprises compute infrastructure and storage infrastructure.

In an embodiment of the present disclosure, the one or more access point of presence modules includes optical line terminal-Gigabit Passive Optical Networks access input/output and Metro Ethernet Access input/output.

In an embodiment of the present disclosure, the one or more aggregation point of presence modules includes access input/output hardware abstraction, limited compute infrastructure and multi-protocol label switching transfer router.

In an embodiment of the present disclosure, the optical line terminal device utilizes software defined networking technology for establishment of the functional disintegration of internal functions of the optical line terminal device.

In an embodiment of the present disclosure, the functional disintegration of internal functions of the optical line terminal device overcomes a problem of occupying large space for installation of the optical line terminal device.

In an embodiment of the present disclosure, the functional disintegration of internal functions of the optical line terminal device determines security layer implementations for remote procedure calls working across the data center point of presence module, the one or more access point of presence modules and the one or more aggregation point of presence modules.

In an embodiment of the present disclosure, the functional disintegration of the internal functions of the optical terminal device determines suitable distribution policies of enforcement and control capabilities for complying with high availability and real-time decision making conditions.

In an embodiment of the present disclosure, the data center point of presence includes a first region and a second region. The first region comprises a leaf and spine fabric and a top-of-rack architecture. The second region comprises compute infrastructure and storage infrastructure.

In an embodiment of the present disclosure, the one or more access points of presence include optical line terminal-Gigabit Passive Optical Network access input/output and Metro Ethernet Access input/output.

In an embodiment of the present disclosure, the one or more aggregation points of presence include access input/output hardware abstraction, limited compute infrastructure and multi-protocol label switching transfer router.

In an embodiment of the present disclosure, the plurality of points of presence is logically connected to each other through a network.

In an embodiment of the present disclosure, the logical connections between the plurality of points of presence defines compute and network capacity requirements for the plurality of points of presence.

In an embodiment of the present disclosure, the disintegration of the optical line terminal into the plurality of points of presence overcomes the problem of occupying large space for installation of the optical line terminal.

In an embodiment of the present disclosure, the disintegration of the optical line terminal defines security layer implementations for remote procedure calls working across the plurality of points of presence.

DESCRIPTION OF THE DRAWINGS

Figure 1:
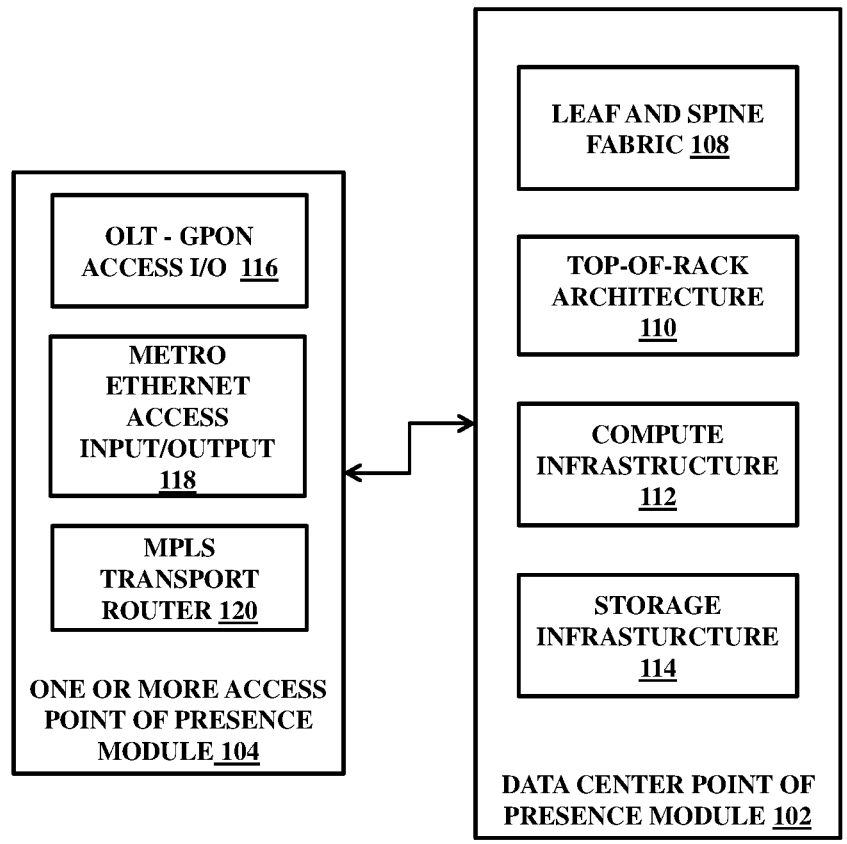
Figure 2:
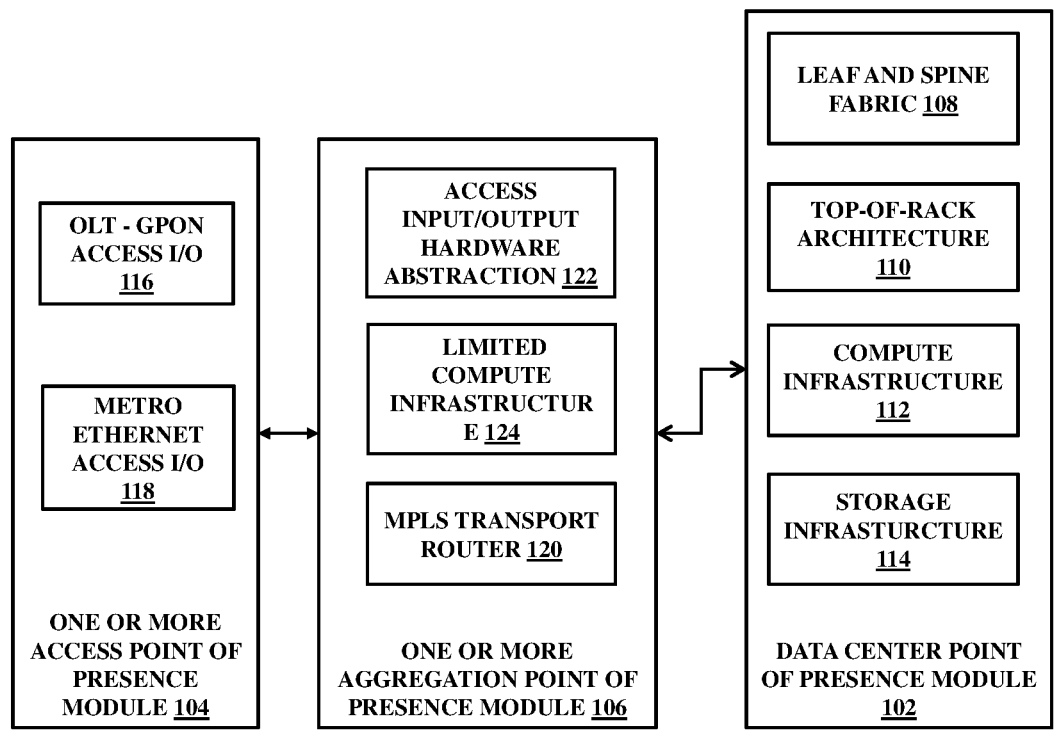
Figure 3:
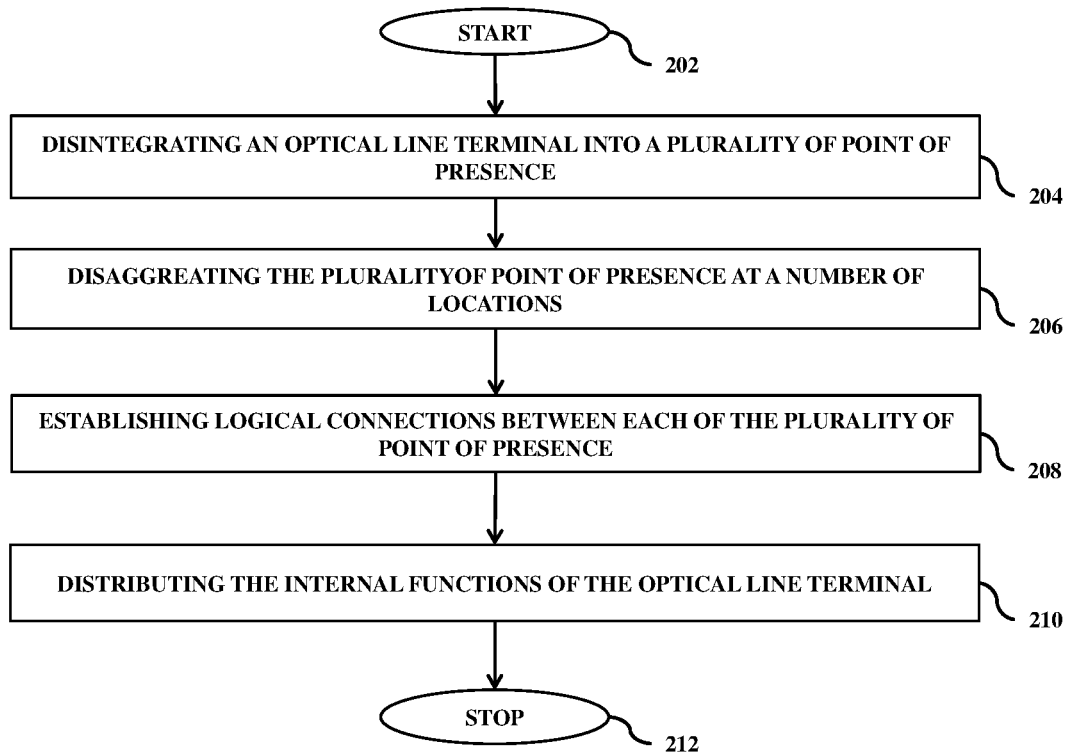

Having thus described the disclosure in general terms, reference will now bemade to the accompanying figures, wherein:

FIG. 1 illustrates an optical line terminal device, in accordance with an embodiment of the present disclosure;

FIG. 2 illustrates the optical line terminal device, in accordance with another embodiment of the present disclosure; and FIG. 3 illustrates a method for establishment of functional disintegration density of internal functions of optical line terminals.

It should be noted that the accompanying figures are intended to present illustrations of exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Optical line terminal device.
102. The data center point of presence module.
104. Access point of presence module.
106. Aggregation point of presence module.
108. A leaf and spine fabric.
110. Top-of-rack architecture.
112. Compute infrastructure.
114. Storage infrastructure.
116. The OLT-GPON access I/O.
118. Metro Ethernet Access input/output.
120. MPLS transport router.
122. The access input/output hardware abstraction.
124. Limited compute infrastructure.
300. Flowchart of a method for establishment of functional disintegration density of internal functions of optical line terminals.
302. The start step.
304. The optical line terminal is disintegrated into a plurality of points of presence.
306. The plurality of points of presence is disaggregated at the one or more locations.
308. The logical connections are established between the plurality of points of presence.
310. The internal functions of the optical line terminal are distributed.
312. The termination step.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention.

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced items.

FIG. 1 illustrates an optical line terminal device 100, in accordance with an embodiment of the present disclosure. In general, the optical line terminal (OLT) device 100 is a device which serves as a service provider endpoint of a passive optical network. In addition, the optical line terminal device 100 is an endpoint hardware device in the passive optical network. The optical line terminal device 100 performs conversion between electrical signals used by the service provider's equipment and fiber optic signals used by the passive optical network. In general, the optical line terminal device 100 transmits a data signal to users at a speed of about 1490 nanometers. In an embodiment of the present disclosure, the optical terminal device 100 is disintegrated into two points of presence (POP). In general, the point of presence (POP) is the point at which two or more different networks or communication devices build a connection with each other. The point of presence mainly refers to an access point, location or facility that connects to and helps other devices establish a connection with the internet.

The optical line terminal device 100 includes a data center point of presence module 102 and one or more access point of presence modules 104. The data center point of presence module 102 includes a first region and a second region. The first region includes a leaf and spine fabric 108 and a top-of-rack (TOR) architecture 110. In general, the leaf and spine fabric 108 is an architecture made of leaf switches and spine switches. In general, the leaf switches aggregate traffic from server nodes and connects to a core of the network. The core of the network is made of the spine switches. In general, the leaf switches mesh into the spine switches, forming an access layer. The access layer delivers network connection points for servers. In general, the top-of-rack architecture 110 is a common architecture of switch-to-server connections. The top-of-rack architecture 110 is a network architecture design in which computing equipment like servers, appliances and other switches located within the same or adjacent rack are connected to an in-rack network switch. In general, in the top-of-rack architecture 110, at least one in-rack network switch is placed in each rack and servers within the rack are connected to the in-rack network switch typically through a copper cable. The second region includes compute infrastructure 112 and storage infrastructure 114. In general, the compute infrastructure 112 is used to handle compute-intensive applications that require large amounts of compute power for extended periods of time. In general, the storage infrastructure 114 refers to the overall set of hardware and software components needed to facilitate storage for a system. In addition, the first region and the second region of the data center point of presence module includes virtual infrastructure, access input/output hardware abstraction, access point of presence software defined network controller (access POP SDN controller), controller applications and Virtual Broadband Network Gateway. In general, Virtual Broadband Network Gateway is an ONOS (open network operating system) application for hosts with private IP addresses to access the internet.

The optical line terminal device 100 includes the one or more access point of presence modules 104. The one or more access point of presence modules 104 includes OLT-GPON access I/O 116 (optical line terminal-gigabit passive optical networks access input/output), Metro Ethernet Access input/output 118 and multiprotocol label switching transport router 120 (MPLS transport router). In general, gigabit passive optical network (GPON) is a point-to-multipoint access mechanism providing end users with the ability to consolidate multiple services onto a single fiber transport network. In addition, the GPON uses optical wavelength division multiplexing (WDM) so a single fiber can be used for both downstream and upstream data. In general, Metro Ethernet is used to describe an Ethernet technology network in a metropolitan area. In addition, the Metro Ethernet is used to connect subscribers to a larger service network or the internet. In general, the MPLS transport router 120 is a protocol-agnostic router designed to speed up and shape traffic flows across enterprise wide area and service provider networks. In addition, the one or more access point of presence modules 104 may include virtual infrastructure, access input/output hardware abstraction, access POP SDN controller, controller applications and virtual Broadband Network Gateway. In general, virtual infrastructure is a software-based IT infrastructure being hosted on another physical infrastructure and meant to be distributed as a service as in cloud computing's Infrastructure as a Service (IaaS) delivery model. In addition, virtual infrastructure provides organizations, particularly smaller ones that cannot afford to build their own physical infrastructure, access to enterprise-grade technology such as servers and applications. In general, SDN controller is an application in software defined networking (SDN) that manages flow control to enable intelligent networking. In addition, SDN controllers are based on protocols, such as OpenFlow, that allow servers to tell switches where to send packets.

The data center point of presence module 102 and the one or more access point of presence modules 104 are logically connected through a network. The logical connections between the data center point of presence module 102 and the one or more access point of presence modules 104 defines compute and network capacity requirements for the data center point of presence module 102 and the one or more access point of presence modules 104.

FIG. 2 illustrates the optical line terminal device 100 in accordance with another embodiment of the present disclosure. The optical line terminal device is disintegrated into three points of presence (POP). The optical line terminal device 100 utilizes software defined networking technology for establishment of the functional disintegration density of the internal functions of the optical line terminal device 100.

The optical line terminal device 100 includes the data center point of presence module 102 and one or more access point of presence modules 104 (as mentioned above in FIG. 1). Also, the optical line terminal device 100 includes one or more aggregation point of presence modules 106.

The optical line terminal device 100 includes the data center point of presence module 102. The data center point of presence module 102 includes the first region and the second region (as mentioned above in FIG. 1). The optical line terminal device 100 includes the one or more access point of presence modules 104. The one or more access point of presence modules include the OLT-GPON access I/O 116 (optical line terminal-gigabit passive optical networks access input/output) and the Metro Ethernet Access input/output 118.

The optical line terminal device 100 includes one or more aggregation point of presence modules 106. The one or more aggregation point of presence modules 106 include access input/output hardware abstraction 122, limited compute infrastructure 124 and the MPLS transport router 120. The limited compute infrastructure 124 can be qualified as lesser availability and capacity of general purpose processing hardware such as less number of CPU Core, less per CPU Core processing capacity, less RAM, less storage, overall less general purpose compute capability. In general, the access input/output hardware abstraction 122 is a layer of programming that allows a computer operating system to interact with a hardware device. In general, the MPLS transport router 120 is a protocol-agnostic router designed to speed up and shape traffic flows across enterprise wide area and service provider networks.

The data center point of presence module 102, the one or more access point of presence modules 104 and the one or more aggregation point of presence modules 106 are logically connected with each other through the network. The logical connections between the data center point of presence module 102, the one or more access point of presence modules 104 and the one or more aggregation point of presence module modules 106 are used to determine compute and network capacity requirements for the data center point of presence module 102 and the one or more access point of presence modules 104. In general, compute is used to describe concepts and objects used for computation and processing. In general, network capacity refers to the amount of traffic that a network can handle at any given time. Also, network capacity is measurement of the maximum amount of data that may be transferred between network locations over a link or network path.

The data center point of presence module 102, the one or more access point of presence modules 104 and the one or more aggregation point of presence modules 106 performs distribution of the internal functions of the optical line terminal device 100. The internal functions of the optical line terminal device 102 are aggregated in a ratio of n:m:1, wherein n corresponds to a number of access point of presence modules (104) and m corresponds to a number of aggregation point of presence modules (106). In addition, 1 represents the centrally hosted internal functions of the optical line terminal device 100 at the data center point of presence module (102). The internal functions of the optical line terminal device 100 include PON management, Layer 2 traffic management and availability management.

The PON management function can be disintegrated as follows. The PON ONU Policy Enforcement as PON OLT Policy Enforcement at the bare metal OLT and ONU hardware in the first point of presence (subscriber side). Accordingly, PON ONU Policy Control and PON OLT Policy Control Functions can be deployed either at the first point of presence or subsequent aggregation point of presence depending on how functional disintegration density has been provisioned. Further, the Media Abstracted Transmission Policy Control Function can be deployed over aggregation point of presence or central point of presence depending on how function disintegration density has been provisioned.

The layer 2 Traffic Management can be disintegrated as follows. The Layer 2 Capability Discovery and Layer 2 Traffic Policy Enforcement at the bare-metal OLT and ONU hardware in the first point of presence (subscriber side). The Switch Silicon Abstracted Layer 2 Capability Control and Layer 2 Traffic Policy Control can be deployed either at first point of presence or subsequent aggregation point of presence depending on how functional disintegration density has been provisioned. The Media Abstracted Layer 2 Discovery and Control Function can be deployed over aggregation point of presence or central point of presence depending on how functional disintegration density has been provisioned.

The Availability Management Function can be disintegrated as follows. The Protection Enforcement Function at the bare-metal OLT and ONU hardware in the first point of presence (subscriber side). The Failure Monitoring and Protection Control can be deployed either at first point of presence or subsequent aggregation point of presence depending on how functional disintegration density has been provisioned. The Alternate Availability Planning and Commissioning Functions can be deployed over aggregation point of presence or central point of presence depending on how functional disintegration density has been provisioned.

In an embodiment of the present disclosure, the one or more access point of presence modules 104 and the one or more aggregation point of presence modules 106 of the optical line terminal device 100 are physically separated at different geographies. The one or more access point of presence modules 104 and the one or more aggregation point of presence modules 106 of the optical line terminal device 100 are hierarchically monitored and controlled from the central point of presence module 102 (can be data center).

FIG. 3 illustrates a flowchart of a method for establishment of functional disintegration density of internal functions of an optical line terminal. It may be noted that to explain the process steps of the flowchart 300, references will be made to the elements of the FIG. 1 and FIG. 2. The flowchart 300 initiates at step 302.

Following step 302, at step 304, the optical line terminal is disintegrated into a plurality of points of presence. The plurality of points of presence includes a data center point of presence, one or more access points of presence and one or more access points of presence. The data center point of presence includes the first region and the second region. The first region includes the leaf and spine fabric 108 and the top-of-rack (TOR) architecture 110. The second region includes the compute infrastructure 112 and the storage infrastructure 114. The one or more access points of presence include the OLT GPON access I/O 116 (optical line terminal-gigabit passive optical networks access input/output) and the Metro Ethernet Access input/output 118. The one or more aggregation points of presence include the access input/output hardware abstraction 122, the limited compute infrastructure 124 and the MPLS transport router 120.

The optical line terminal is disintegrated using software defined network (SDN) technology for the geographies where physical space and hosting capabilities are limited. In an embodiment of the present disclosure, the functional disintegration of internal functions of optical line terminal device 100 overcomes the problem of occupying large space for installation of the optical line terminal device. In addition, the disintegration of the optical line terminal defines appropriate distribution of configuration meta model depending on the functional disintegration implemented over different points of Presence, while keeping special considerations of grouping together latency sensitive configuration attributes required for real-time decision making. The disintegration of the optical line terminal defines security layer implementations for remote procedure calls working across the plurality of presence. In an embodiment of the present disclosure, the functional disintegration of the internal functions of the optical line terminal device 100 determines suitable distribution policies of enforcement and control capabilities for complying with high availability and real-time decision making conditions. Examples of suitable distribution policies include the way PON Management capability is distributed across multiple points of presence by disintegrating it against monitoring capabilities, enforcement capabilities, control capabilities and abstracted control capabilities.

In general, the Software-defined networking (SDN) technology is an approach to cloud computing that facilitates network management and enables programmatically efficient network configuration in order to improve network performance and monitoring. SDN suggests centralizing network intelligence in one network component by disassociating the forwarding process of network packets (data plane) from the routing process (control plane). The control plane consists of one or more controllers which are considered as the brain of SDN network where the whole intelligence is incorporated.

At step 306, the plurality of points of presence is disaggregated at the one or more locations. At step 308, logical connections are established between the plurality of points of presence. The plurality of points of presence are logically connected to each other through a network. The logical connections between the plurality of points of presence determine compute and network capacity requirements for the plurality of points of presence. At step 310, internal functions of the optical line terminal are distributed. The internal functions of the optical line terminal are aggregated in a ratio of n:m:1, wherein n corresponds to a number of access points of presence and m corresponds to a number of aggregation points of presence. In addition, 1 represents the centrally hosted internal functions of the optical line terminal at the data center point of presence, and aggregation of the internal functions of the optical line terminal are set up in the ratio of n:m:1. 'n' is the number of access points of presence and 'm' is the number of aggregation points of presence. In addition, 1 represents the centrally hosted internal functions of the optical line terminal at the data center point of presence. The flowchart 300 terminates at step 312.

It may be noted that the flowchart 300 is explained to have above stated process steps; however, those skilled in the art would appreciate that the flowchart 300 may have more/less number of process steps which may enable all the above stated embodiments of the present disclosure.

The disintegration of the optical line terminal has numerous advantages over the prior art. The disintegration of the optical line terminal is done for the geographies where physical space and related resources are scarce. In addition, the disintegration of the optical fiber terminal using the software defined network or software defined access technologies optimizes physical resource expansion. Further, the disintegration of the optical fiber terminal using the software defined network or software defined access technologies optimizes physical resource consumption. Furthermore, the disintegration of the optical fiber terminal using the software defined network or software defined access technologies optimizes energy costs. Also, the disintegration of the optical fiber terminal using the software defined network or software defined access technologies optimizes operation overhead.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood thatvarious omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What we claim is:

1. An optical line terminal device for establishment of functional disintegration of internal functions of the optical line terminal device, the optical line terminal device comprising:
   a data center point of presence module;
   one or more access point of presence modules; and
   one or more aggregation point of presence modules,
   wherein the data center point of presence module, the one or more access point of presence modules and the one or more aggregation point of presence modules perform distribution of the internal functions of the optical line terminal device, wherein the internal functions of the optical line terminal device are aggregated in a ratio of n:m:1, wherein n corresponds to a number of access point of presence modules and m corresponds to a number of aggregation point of presence modules, wherein 1 represents the centrally hosted internal functions of the optical line terminal at the data center point of presence module,
   wherein the optical line terminal device utilizes software defined networking technology for establishment of the functional disintegration of the internal functions of the optical line terminal device.

2. The optical line terminal device as claimed in claim 1, wherein the data center point of presence module, the one or more access point of presence modules and the one or more aggregation point of presence modules are logically connected with each other through a network, wherein the logical connections between the data center point of presence module, the one or more access point of presence modules and the one or more aggregation point of presence modules determines compute and network capacity requirements for the data center point of presence module, the one or more access point of presence modules and the one or more aggregation point of presence modules.

3. The optical line terminal device as claimed in claim 1, wherein the data center point of presence module comprises a first region and a second region, wherein the first region comprises a leaf and spine fabric and a top-of-rack architecture, wherein the second region comprises compute infrastructure and storage infrastructure.

4. The optical line terminal device as claimed in claim 1, wherein each of the one or more access point of presence modules comprises optical line terminal-Gigabit Passive Optical Networks access input/output and Metro Ethernet Access input/output.

5. The optical line terminal device as claimed in claim 1, wherein each of the one or more aggregation point of presence modules comprises access input/output hardware abstraction, limited compute infrastructure and multi-protocol label switching transfer router.

6. The optical line terminal device as claimed in claim 1, wherein the functional disintegration of the internal functions of the optical line terminal device overcomes a problem of occupying large space for installation of the optical line terminal device.

7. The optical line terminal device as claimed in claim 1, wherein the functional disintegration of the internal functions of the optical line terminal device determines security layer implementations for remote procedure calls working across the data center point of presence module, the one or more access point of presence modules and the one or more aggregation point of presence modules.

8. The optical line terminal device as claimed in claim 1, wherein the functional disintegration of the internal functions of the optical terminal device determines suitable distribution policies of enforcement and control capabilities for complying with high availability and real-time decision making conditions.

9. An optical line terminal device for establishment of functional disintegration of internal functions of the optical line terminal device, the optical line terminal device comprising:
    a data center point of presence module;
    one or more access point of presence modules; and
    one or more aggregation point of presence modules,
    wherein the data center point of presence module, the one or more access point of presence modules and the one or more aggregation point of presence modules perform distribution of the internal functions of the optical line terminal device, wherein the internal functions of the optical line terminal device are aggregated in a ratio of n:m:1, wherein n corresponds to a number of access point of presence modules and m corresponds to a number of aggregation point of presence modules, wherein 1 represents the centrally hosted internal functions of the optical line terminal at the data center point of presence module,
    wherein the functional disintegration of the internal functions of the optical line terminal device overcomes a problem of occupying large space for installation of the optical line terminal device,
    wherein the optical line terminal device utilizes software defined networking technology for establishment of the functional disintegration of the internal functions of the optical line terminal device.

10. The optical line terminal device as claimed in claim 9, wherein the data center point of presence module, the one or more access point of presence modules and the one or more aggregation point of presence modules are logically connected with each other through a network, wherein the logical connections between the data center point of presence module, the one or more access point of presence modules and the one or more aggregation point of presence modules determines compute and network capacity requirements for the plurality of point of presence.

11. The optical line terminal device as claimed in claim 9, wherein the functional disintegration of the internal functions of the optical line terminal device determines security layer implementations for remote procedure calls working across the data center point of presence module, the one or more access point of presence modules and the one or more aggregation point of presence modules.

12. The optical line terminal device as claimed in claim 9, wherein the functional disintegration of the internal functions of the optical terminal device determines suitable distribution policies of enforcement and control capabilities for complying with high availability and real-time decision making conditions.

13. A method for establishment of functional disintegration of internal functions of optical line terminal, the method comprising:
    disintegrating the optical line terminal into a plurality of points of presence, wherein the plurality of points of presence comprises a data center point of presence, one or more aggregation points of presence and one or more access points of presence;
    disaggregating the plurality of points of presence at one or more locations;
    establishing logical connections between each of the plurality of points of presence, wherein the logical connections between each of the plurality of points of presence determines compute and network capacity requirements for each of the plurality of points of presence; and
    distributing the internal functions of the optical line terminal, wherein each of the plurality of points of presence performs distribution of the internal functions of the optical line terminal, wherein the internal functions of the optical line terminal are aggregated in a ratio of n:m:1, wherein n corresponds to a number of access points of presence and m corresponds to a number of aggregation points of presence, wherein 1 represents the centrally hosted internal functions of the optical line terminal at the data center point of presence,
    wherein the method utilizes software defined networking technology for establishment of the functional disintegration of the internal functions of the optical line terminal.

14. The method as claimed in claim 13, wherein the data center point of presence comprises a first region and a second region, wherein the first region comprises a leaf and spine fabric and a top-of-rack architecture, wherein the second region comprises compute infrastructure and storage infrastructure.

15. The method as claimed in claim 13, wherein the one or more access points of presence comprise optical line terminal-Gigabit Passive Optical Network access input/output and Metro Ethernet Access input/output.

16. The method as claimed in claim 13, wherein the one or more aggregation points of presence comprise access input/output hardware abstraction, limited compute infrastructure and multi-protocol label switching transfer router.

17. The method as claimed in claim 13, wherein the disintegration of the optical line terminal into the plurality of points of presence overcomes a problem of occupying large space for installation of the optical line terminal.

18. The method as claimed in claim 13, wherein the disintegration of the optical line terminal defines security layer implementations for remote procedure calls working across the plurality of points of presence.

\* \* \* \* \*